(12) United States Patent
Lee et al.

(10) Patent No.: US 6,812,270 B2
(45) Date of Patent: Nov. 2, 2004

(54) PROCESS OF PRODUCING HIGHLY HOMOGENEOUS CELLULOSE SOLUTION

(75) Inventors: Tae-jung Lee, Anyang-si (KR); Soo-myung Choi, Anyang-si (KR); Yun-hyuk Bang, Daejon-si (KR); Seok-jong Han, Suwon-si (KR)

(73) Assignee: Hyosung Corporation, Seoul (KR)

( * ) Notice: Subject to any disclaimer, the term of this patent is extended or adjusted under 35 U.S.C. 154(b) by 167 days.

(21) Appl. No.: 10/214,941

(22) Filed: Aug. 9, 2002

(65) Prior Publication Data

US 2003/0225206 A1 Dec. 4, 2003

(30) Foreign Application Priority Data

May 31, 2002 (KR) ........................................ 2002-30738

(51) Int. Cl.[7] .................................................. C08L 1/00
(52) U.S. Cl. .......................... 524/35; 524/96; 524/503; 106/200.1; 106/200.2; 106/200.3
(58) Field of Search ............................ 524/35, 96, 503; 106/200.1, 200.2, 200.3

(56) References Cited

U.S. PATENT DOCUMENTS

| | | |
|---|---|---|
| 3,447,935 A | 6/1969 | Marley |
| 4,142,913 A | 3/1979 | McCorsley, III et al. |
| 4,144,080 A | 3/1979 | McCorsley, III et al. |
| 4,196,282 A | 4/1980 | Franks et al. |
| 4,246,221 A | 1/1981 | McCorsley, III |
| 4,255,300 A * | 3/1981 | Franks et al. ............... 524/35 |
| 4,416,698 A | 11/1983 | McCorsley, III |

FOREIGN PATENT DOCUMENTS

| | | |
|---|---|---|
| WO | WO 94/06530 | 3/1994 |
| WO | WO 97/47790 | 12/1997 |

* cited by examiner

*Primary Examiner*—Ana Woodward
(74) *Attorney, Agent, or Firm*—Nath & Associates PLLC; Gary M. Nath; Tanya E. Harkins

(57) ABSTRACT

Disclosed is a process of producing a highly homogeneous cellulose solution, in which a mixture of powdered cellulose with polyvinyl alcohol powder is fed in conjunction with concentrated liquid NMMO into a kneader or an extruder to produce the highly homogeneous cellulose solution, or into the kneader to produce a swollen cellulose/polyvinyl alcohol paste and the paste thus produced is moved into the extruder to produce the highly homogeneous cellulose solution. The cellulose solution is extruded through a nozzle into a cellulose fiber. The process is advantageous in that the highly homogeneous cellulose solution can be rapidly and inexpensively produced because the cellulose solution is produced without a vacuum distillation step or separate swelling step, and formation of fibrils is prevented, thereby cellulose fibers with excellent flexibility and strength are produced from the cellulose solution.

9 Claims, 1 Drawing Sheet

PROCESS OF PRODUCING HIGHLY HOMOGENEOUS CELLULOSE SOLUTION

BACKGROUND OF THE INVENTION

1. Field of the Invention

The present invention relates to a process of producing a highly homogeneous cellulose solution. More particularly, the present invention relates to a process of producing a highly homogeneous cellulose solution, in which a mixture of powdered cellulose with polyvinyl alcohol powder is fed in conjunction with concentrated NMMO (N-methylmorpholine N-oxide) into a kneader or an extruder to produce a highly homogeneous cellulose solution, or into the kneader connected with an extruder to produce a swollen cellulose/polyvinyl alcohol paste and the paste thus produced is moved into the extruder at a higher temperature than the kneader to produce a highly homogeneous cellulose solution.

2. Description of the Prior Art

It is known that cellulose has a very high affinity with other substances but is insoluble in many solvents owing to a chain structure having strong intramolecular and intermolecular hydrogen bonding. Among solvents used to dissolve cellulose, NMMO is most widely used.

Because of advantages that pollutants are not generated because a used solvent is completely recovered and recycled, and finished products have high mechanical strength, a process of producing cellulose fibers using such a NMMO solvent is usually applied to a process of producing products comprising cellulose, as suggested in U.S. Pat. No. 3,447,935.

Various processes of producing such cellulose fibers have been proposed. For example, U.S. Pat. Nos. 4,142,913, 4,144,080, 4,196,282, and 4,246,221 disclose processes of producing cellulose fibers, in which cellulose is swollen in a NMMO aqueous solution containing 50% or less moisture, and water is vacuum-distilled from the NMMO aqueous solution having swollen cellulose to produce spinning liquid and the spinning liquid is extruded into the cellulose fibers.

However, these processes are disadvantageous in that physical properties of the cellulose fibers are readily reduced owing to thermal degradation because a long time is consumed from a dissolution step of cellulose to a spinning step of cellulose, and production cost of the cellulose fibers is increased because energy is excessively consumed.

Further, WO 94/06530 discloses a process of producing a cellulose solution by removing moisture using a thin film distillation device, but it is disadvantageous in that the device is complicated and not suitable to produce a highly viscous cellulose solution.

Furthermore, U.S. Pat. No. 4,221,574 suggests a process of producing cellulose fibers, in which liquid tertiary amine oxide containing 5 to 15 wt % moisture is used as a solvent, and a cellulose sheet is swollen at 65 to 95° C. and heated with agitation to be spun. However, this process has a disadvantage in that a nonhomogeneous cellulose solution is obtained because of a film formed on a pulp sheet.

Meanwhile, according to U.S. Pat. No. 4,416,698, solid NMMO is used instead of liquid NMMO, and the solid NMMO and a cellulose pulp are agitated in an extruding device and the resulting mixture is spun, but this process is disadvantageous in that the amount of undissolved particles is large in a solution because a great amount of the solid NMMO and cellulose pulp powder is used in the process, and so mass production of the cellulose pulp is hard to accomplish.

In addition, WO 97/47790 proposes a process of producing cellulose fibers, in which fibril-typed cellulose powder used instead of cellulose pulp sheet and a high concentration NMMO aqueous solution, containing 5 to 20 wt % moisture, with a temperature of 50 to 130° C. are mixed in an extruder with twin screws to be spun. However, this process is disadvantageous in that production cost of the cellulose fibers is increased because the number of replacable filters for removing undissolved particles and impurities is increased during spinning of cellulose, and physical properties of the cellulose fibers are reduced because a great amount of undissolved particles prevents a cellulose solution from being uniform.

Moreover, a process of producing a cellulose solution is provided by U.S. Pat. No. 4,416,698 and WO 97/47790, in which a mixing, a swelling (paste), and a dissolving step are conducted in an extruder, but this has a disadvantage of not sufficiently dissolving cellulose in a solvent.

SUMMARY OF THE INVENTION

Therefore, it is an object of the present invention to avoid the above disadvantages, and to provide a process of producing a highly homogeneous cellulose solution, having advantages in that a vacuum distillation step is not needed to remove water owing to use of a concentrated NMMO aqueous solution, the highly homogeneous cellulose solution is obtained without a separate swelling step in an extruder, and a cellulose fiber with excellent resistance to fibrillation is produced by using such homogeneous cellulose solution.

BRIEF DESCRIPTION OF THE DRAWINGS

The above and other objects, features and other advantages of the present device will be more clearly understood from the following detailed description taken in conjunction with the accompanying drawings, in which.

DETAILED DESCRIPTION OF THE INVENTION

Figure 1:
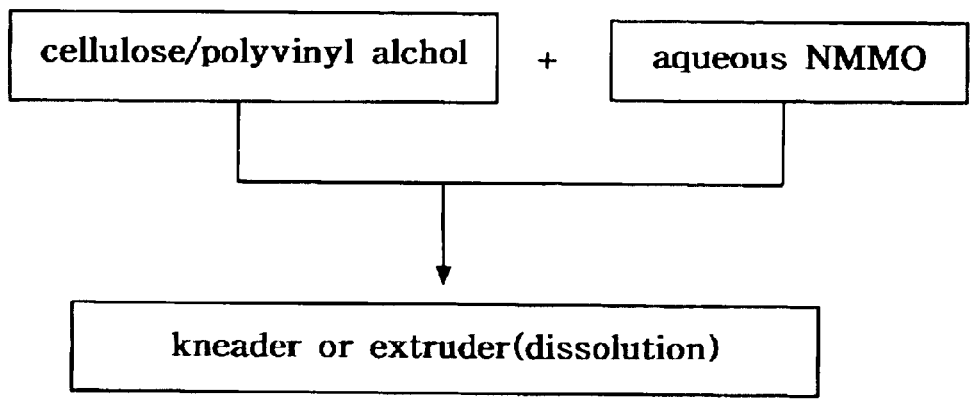
FIG. 1 is a schematic flowchart illustrating a production process of a highly homogeneous cellulose solution according to a first embodiment of the present invention.

With reference to FIG. 1, cellulose powder is crushed by a crusher provided with a knife in such a way that its particle size is 500 $\mu$m or less, and preferably 300 $\mu$m or less. When the particle size is more than 500 $\mu$m, it is difficult to uniformly disperse and swell the cellulose powder in a kneader.

The cellulose powder having the particle size of 500 $\mu$m or less is then mixed with polyvinyl alcohol powder with a degree of polymerization of 1000 to 5000 in a powder mixing device. At this time, a polyvinyl alcohol content based on the cellulose powder is 0.1 to 20 wt %, and preferably 1 to 10 wt %. For example, when the polyvinyl alcohol content is less than 0.1 wt %, it is hard to improve physical properties such as resistance to fibrillation. On the other hand, when the content is more than 20 wt %, a recovery expense of NMMO is increased because dissolution occurs in a clotting bath after a mixture of the cellulose powder with the polyvinyl alcohol powder is spun.

50 wt % NMMO aqueous solution is concentrated into the NMMO aqueous solution containing 10 to 20 wt % moisture by a traditional concentrating method.

The mixture of the cellulose powder with the polyvinyl alcohol powder and the concentrated NMMO aqueous solution are simultaneously fed into a kneader at 75 to 105° C. or an extruder at 85 to 105° C. to be dissolved and spun through a nozzle. At this time, a content of the mixture of the cellulose powder with the polyvinyl alcohol powder is varied according to a degree of polymerization, for example, 5 to 20 wt % based on the NMMO aqueous solution and preferably 9 to 14 wt %. When the content is less than 5 wt %, fiber with desired physical properties cannot be obtained. On the other hand, when the content is more than 20 wt %, the mixture is difficult to dissolve in the NMMO aqueous solution, and so a homogeneous title solution cannot be obtained.

Figure 2:
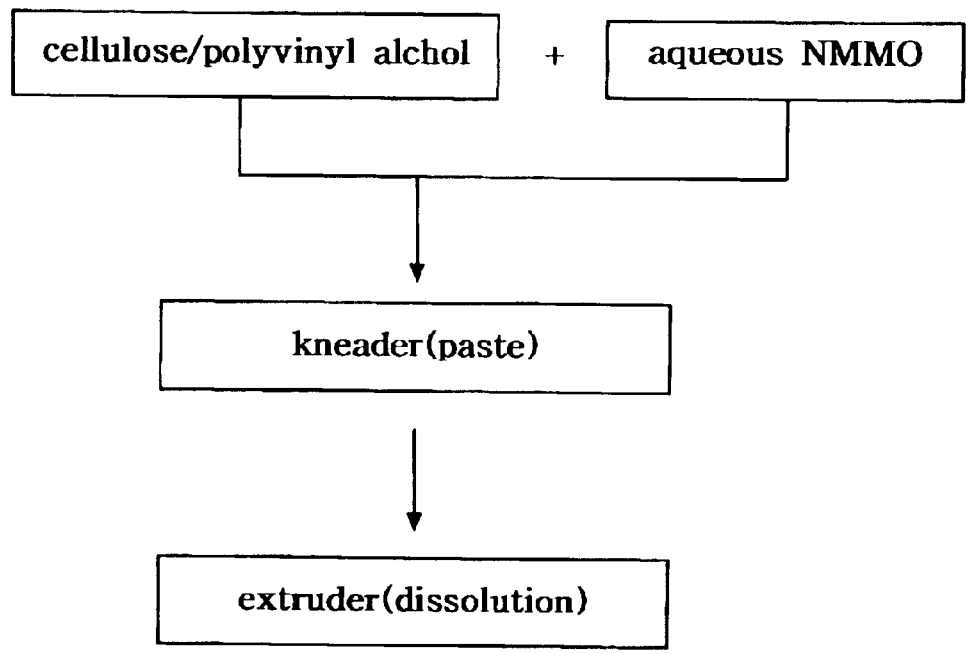
FIG. 2 is a schematic flowchart illustrating a production process of a highly homogeneous cellulose solution according to a second embodiment of the present invention.

Turning now to FIG. 2, the mixture of the cellulose powder with the polyvinyl alcohol powder and the concentrated NMMO aqueous solution containing 10 to 20 wt % moisture are simultaneously fed into a kneader. The NMMO aqueous solution makes the mixture of the cellulose powder with the polyvinyl alcohol powder swell, and ranges from 80 to 90° C. in temperature during being fed to the kneader.

A temperature in the kneader is 75 to 80° C., and a content of the mixture of the cellulose powder with the polyvinyl alcohol powder is 5 to 20 wt % based on the NMMO aqueous solution, preferably 9 to 14 wt %.

The mixture of the cellulose powder with the polyvinyl alcohol powder and the NMMO aqueous solution fed into the kneader are compressed, drawn, kneaded, and sheared to produce a paste comprising cellulose/polyvinyl alcohol. The paste thus produced is transported at 75 to 80° C. to an extruder. The paste transported to the extruder is melted at 85 to 105° C., filtered, and spun through a nozzle into cellulose fibers.

A better understanding of the present invention may be obtained by reading the following examples which are set forth to illustrate, but are not to be construed to limit the present invention.

Solutions produced according to examples as will be described below are evaluated as follows:

(a) Homogeneity of a Cellulose Solution

When cellulose/polyvinyl alcohol powder is dissolved in monohydrate NMMQ (1 hydrate NMMO) in such an amount that the cellulose/polyvinyl alcohol powder is 12 wt % based on monohydrate NMMO, particles not dissolved in monohydrate NNMMO are confirmed by a polarization microscope. At this time, the number of undissolved particles positioned on a slide glass with a size of 5×5 mm$^2$ is counted to evaluate homogeneity of the cellulose solution according to the present invention.

(b) Weight Average Degree of Polymerization ($DP_w$)

An intrinsic viscosity (IV) of cellulose dissolved in a solvent is obtained at 25±0.01° C. within a concentration range of 0.1 to 0.6 g/dl by a Ubbelohde viscometer using a 0.5M cupriethylene diamine hydroxide solution prepared according to ASTM D539-51T. At this time, the intrinsic viscosity is obtained by extrapolating a specific viscosity against the concentration, and the intrinsic viscosity thus obtained was substituted for the Mark-Houwink equation, as will be described below, to obtain a degree of polymerization.

$$[IV]=0.98\times10^{-2}DP_w^{0.9}$$

(c) Physical Properties of Cellulose Fiber dry strength: strength of the cellulose fibers after the cellulose fibers are dried at 107° C. for 2 hours (g/d)

wet strength: strength of the cellulose fibers after the cellulose fibers are left at 25° C. for 24 hours under a relative humidity of 65 RH and subjected to a conditioning process (g/d)

(d) Fibrillation

A fibrillation index is evaluated as follows:

Samples are arranged according to a degree of fibrillation. In other words, a base fiber length of each sample is measured, a fibril number according to the base fiber length is counted, a length of each fibril is then measured. After that, an average fibril length is obtained, and the fibril number is multiplied by the average fibril length to produce the fibrillation index. The sample with the maximum value of the fibrillation index is the fiber having the highest degree of fibrillation, and corresponds to the fibrillation index of 10. The fiber in which fibrillation is not accomplished at all corresponds to the fibrillation index of 0. Other samples have a fibrillation index ranging from 1 to 10.

EXAMPLE 1

A cellulose sheet with a weight average degree of polymerization of 1000 was fed into a crusher with a 100 mesh filter to produce cellulose powder with a particle size of 500 μm or less, and polyvinyl alcohol powder and the cellulose powder were put into a powder mixing device in such an amount that the polyvinyl alcohol powder is 1 wt % based on the cellulose powder to be mixed. Liquid NMMO (1 hydrate) at 89° C. concentrated according to a traditional method was poured at a speed of 6900 g/h by a gear pump into a kneader at 78° C., and a mixed powder of the cellulose powder with the polyvinyl alcohol powder was poured in a speed of 853 g/h by a screw-typed feeder into the kneader to produce 11 wt % cellulose/polyvinyl alcohol paste. NMMO and the cellulose/polyvinyl alcohol mixed powder were retained in the kneader for 8 to 10 min to produce the cellulose/polyvinyl alcohol paste, and the paste thus produced was fed into an extruder with twin screws. The paste was dissolved at 90 to 95° C. by use of the screw at 200 rpm in the extruder and extruded through a nozzle from the extruder. A concentration of the resulting cellulose solution was 11 wt %, and the resulting cellulose solution had no undissolved cellulose particles and were homogeneous. The degree of polymerization of cellulose was 945.

EXAMPLE 2

The procedure of example 1 was repeated except that polyvinyl alcohol powder in a mixed powder was 5 wt % based on cellulose powder. A concentration of the resulting cellulose solution was 11 wt %, and the resulting cellulose solution had no undissolved cellulose particles and were homogeneous. The degree of polymerization of cellulose was 930.

EXAMPLE 3

The procedure of example 1 was repeated except that cellulose/polyvinyl alcohol mixed powder and NMMO were simultaneously fed into a kneader at 100° C. Undissolved cellulose particles were hardly found in the resulting solution and a degree of polymerization of cellulose in the resulting solution was 900.

EXAMPLE 4

The procedure of example 1 was repeated except that cellulose/polyvinyl alcohol mixed powder and NMMO were simultaneously fed into an extruder (extruder with twin screws) at 95° C. Undissolved cellulose particles were hardly found in the resulting solution and a degree of polymerization of cellulose in the resulting solution was 870.

COMPARATIVE EXAMPLE

Cellulose with a weight average degree of polymerization of 1000 was ground by a crusher to particles each having diameters of 500 µm or less, and fed in conjunction with liquid NMMO (1 hydrate) at 89° C. into an extruder with twin screws at 95° C. to be dissolved and extruded. A concentration of the resulting cellulose solution was 11 wt %, and undissolved cellulose particles having diameters of 50 to 100 µm were observed in the resulting solution by a polarization microscope. The degree of polymerization of cellulose was 740.

TABLE 1

|  | Ex. 1 | Ex. 2 | Ex. 3 | Ex. 4 | Co. Ex. |
| --- | --- | --- | --- | --- | --- |
| [1]Undissolved particles | 0 | 0 | 19 | 10 | 27 |
| Dry strength (g/d) | 7.5 | 7.6 | 6.9 | 7.1 | 6.4 |
| Dry elasticity (g/d) | 310 | 298 | 267 | 273 | 242 |
| Wet strength (g/d) | 5.9 | 5.7 | 5.4 | 5.3 | 4.7 |
| Fibrillation index | 1 | 1 | 1 | 1 | 7 |

[1]Undissolved particles: number of undissolved cellulose particles on a slide glass with a size of 5 × 5 mm$^2$ As described above, the present invention is advantageous in that a highly homogeneous cellulose solution can be rapidly and readily produced in an extruder without any separate swelling step. Other advantages are that production cost of the homogeneous cellulose solution is reduced because a vacuum distillation step is not needed to remove water owing to use of a concentrated NMMO aqueous solution, and the cellulose fibers produced using the cellulose solution according to the present invention have excellent flexibility and resistance to fibrillation.

It should also be understood that the foregoing relates to only the scope of the invention is defined by the appended claims rather than by the description preceding them, and all changes that fall within meets and bounds of the claims, or equivalence of such meets and bounds are therefore intended to be embraced by the claims.

What is claimed is:

1. A process of producing a highly homogeneous cellulose solution, comprising the steps of:

feeding a mixture of 5 to 20 wt %, based on a concentration of liquid N-methylmorpholine N-oxide, of polyvinyl alcohol powder and cellulose powder, in conjunction with liquid N-methlymorpholine N-oxide into a kneader at 75 to 105° C. to be swollen to produce a paste, said mixture containing 0.1 to 20 wt % based on the cellulose powder, of polyvinyl alcohol powder; and feeding the paste into an extruder at 85 to 105° C. to produce a cellulose solution.

2. The process according to claim 1, wherein the liquid N-methylmorpholine N-oxide and the mixture of the cellulose powder/the polyvinyl alcohol powder are fed into the kneader at 75 to 80° C. to produce the cellulose solution.

3. The process according to claim 1, wherein the concentrated liquid N-methylmorpholine N-oxide contains 10 to 20wt % moisture.

4. The process according to claim 1, wherein the cellulose powder is 500 µm or less in particle size.

5. The process according to claim 1, wherein the polyvinyl alcohol powder is 1000 to 5000 in degree of polymerization.

6. A process of producing a highly homogeneous cellulose solution, comprising the steps of:

feeding a mixture of 5 to 20 wt %, based on a concentration of liquid N-methylmorpholine N-oxide, of polyvinyl alcohol powder and cellulose powder, in conjunction with liquid N-methlymorpholine N-oxide into an extruder at 85 to 105° C. to produce a cellulose solution.

7. The process according to claim 6, wherein the concentrated liquid N-methylmorpholine N-oxide contains 10 to 20 wt % moisture.

8. The process according to claim 6, wherein the cellulose powder is 500 µm or less in particle size.

9. The process according to claim 6, wherein the polyvinyl alcohol powder is 1000 to 5000 in degree of polymerization.

* * * * *